April 9, 1963 D. S. BOND 3,085,243
RADAR TRACKING AND DISPLAY SYSTEM
Filed Oct. 15, 1957 6 Sheets-Sheet 1

INVENTOR.
DONALD S. BOND
BY *J. C. Whittaker*
ATTORNEY

April 9, 1963 D. S. BOND 3,085,243
RADAR TRACKING AND DISPLAY SYSTEM
Filed Oct. 15, 1957 6 Sheets-Sheet 2

INVENTOR.
DONALD S. BOND
BY
ATTORNEY

United States Patent Office 3,085,243
Patented Apr. 9, 1963

3,085,243
RADAR TRACKING AND DISPLAY SYSTEM
Donald S. Bond, Princeton, N.J., assignor to Radio Corporation of America, a corporation of Delaware
Filed Oct. 15, 1957, Ser. No. 690,688
17 Claims. (Cl. 343—7.3)

The present invention relates to the art of radar detection and, more particularly, to systems for establishing and displaying the angular location of a target relative to a predetermined reference axis or plane extending from the radar system. While not limited thereto, the invention is particularly useful for controlling the firing of weapons such as rockets, guns, or the like, from an aircraft.

Numerous means have been proposed for displaying a radar map of an extended target area in which a multiplicity of targets may appear. Means have also been proposed for providing precise angular information on a single target within the radar field of view. However, the attempts to combine the functions of search and fire-control on ground targets in airborne radar system have met with major difficulties of inaccuracy, lack of discrimination against ground clutter, or elaborateness of the apparatus. Furthermore, the resulting presentations of the radar picture have lacked the simplicity and ease of interpretation that characterize an optical gun-sight, in which a pair of crosshairs may be visible in a somewhat narrow field of view.

It is an object of the present invention to provide an improved radar display system.

It is another object of the present invention to provide such a system which is especially suitable for aiming a weapon on an aircraft at a selected target on the display.

It is another object of the present invention to provide a radar-type display which is simulative of an optical display wherein a pair of crosshairs indicate the aiming point of the weapon and targets appear in the field of view covered by the crosshairs.

Another object of the present invention is to provide, automatically, range information on a selected target.

Yet another object of the present invention is to provide, for a radar display of the type wherein a restricted range area is displayed, circuit means for producing a range marker midway between the minimum and the maximum ranges displayed, regardless of the values of the minimum and maximum ranges.

The invention includes means for radiating energy in a directive beam pattern including two directive lobes displaced a relatively small angle from one another and receiving energy reflected from objects in the paths of said two lobes. In a preferred form of the invention, the energy is radiated as pulses of high frequency energy and received as return pulses or echoes. The received energy is displayed on a display device, such as a cathode ray tube or the like, in an angle-range type display. Reflected energy from objects in the path of each directive lobe is detected in a restricted interval of the range displayed on the display means. The restricted interval is a fraction of the entire range interval displayed on the display means. The energy received in the restricted interval of range from objects in the path of one of the lobes is compared with that received in the restricted interval of range from objects in the path of the other lobe. When there is a difference in amplitude between the two, a control signal is derived having a sense and magnitude which are functions of the sense and magnitude of said difference in amplitude. Adjusting means responsive to the control signal adjusts the position in range of said range interval so as to adjust said control signal to a predetermined value—zero volts in one form of the invention. The control signal may be used to drive a range indication device which places a range indication in a predetermined position on the display.

The two directive lobes mentioned in the foregoing paragraph may be radiated simultaneously or alternately. In a preferred form of the invention, the range indication on the display is electronic in nature and is always maintained midway between the minimum and maximum ranges of the display.

One specific form of the invention includes radar apparatus aboard an aircraft. The apparatus directs a narrow pencil beam through a limited azimuthal sector. The beam is also directed successively upward and downward in elevation through a relatively small angle, for example, one on the order of one beam width. This latter process of "lobing" is carried out at a rate that is preferably lower than the horizontal scanning rate. A type-B-display (azimuth-range) indicator is employed at the output of one video channel. A second video channel includes a range gate and a means responsive to the integrated alternating current (A.C.) component of the gate output of the lobing frequency to adjust the delay of the range gate. The range gate is thereby positioned to receive target signals originating along the bisector of the vertical lobing pattern.

A range gate marker is displayed on the screen of the indicator as a horizontal line. A vertical line corresponding to antenna beam position in the longitudinal vertical plane of the aircraft axis also appears on the display. The intersection of these two lines is the aiming point or boresight for fire-control purposes. A quasi-C display is thus produced without the serious disadvantage of poor signal-noise (clutter) ratio present in a true type-C presentation.

This invention will be described in greater detail by reference to the accompanying drawings in which:

FIGURES 5a–f are illustrations of waveforms present in various parts of the radar system;

FIGURES 6a–g are illustrations of waveforms present in the delay gate circuit;

Similar reference characters are applied to similar elements throughout the drawings.

Figure 1:
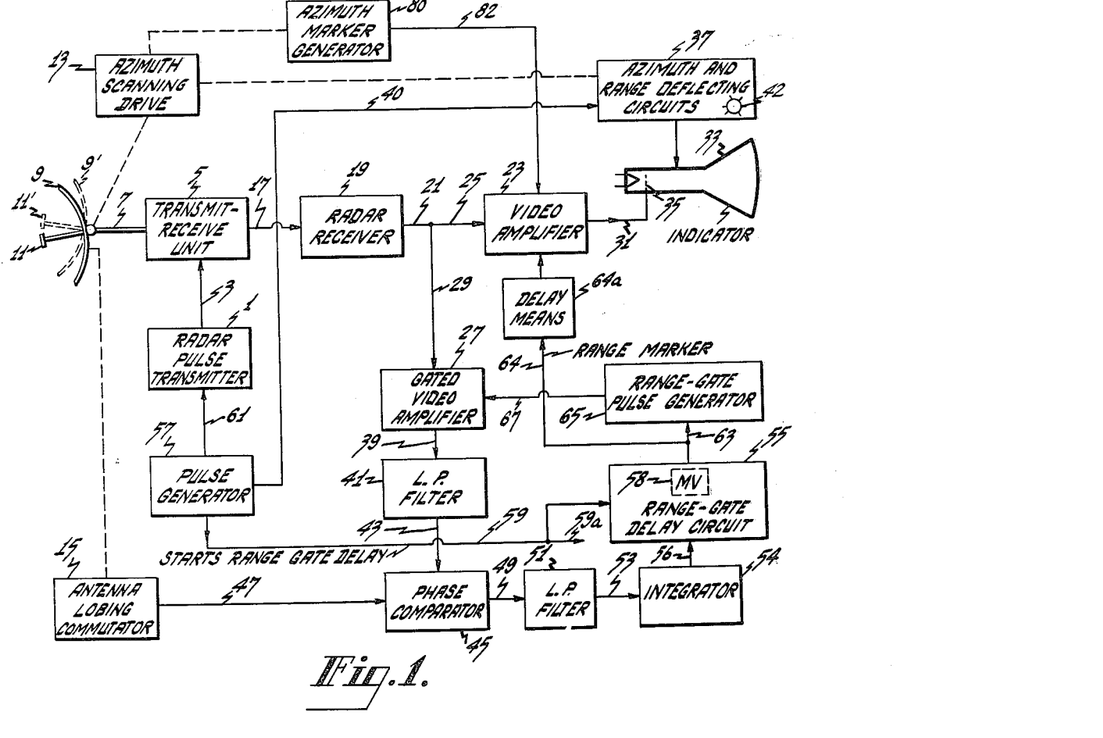
FIGURE 1 is a block circuit diagram of one embodiment of my invention.

Referring to FIGURE 1, radar pulse transmitter 1 is capable of feeding short wave trains of high peak RF energy by electrical path 3 to transmit-receive unit 5. The energy is then applied via transmission line 7, which may comprise a waveguide or the like, to directive antenna 9. The latter focuses to a beam of narrow angular dimensions the RF energy from 7 and may, for example, be a paraboloid of revolution with feed horn 11. Antenna 9 is capable of being trained rapidly and cyclically in one plane, here considered in azimuth, so as to scan repeatedly a narrow sector in azimuth. Azimuth scanning drive 13, which may, for example, be a motor-driven mechanism of well-known type, effects this sector scanning process. In one form of the invention, antenna 9 and drive 13 may comprise a Foster scanner or similar directive antenna arrangement.

The radiation pattern of antenna 9 is capable of further orientation in elevation angle. Typically, the antenna may effectively be shifted cyclically to position 9' and back to position 9 by means of antenna lobing commutator 15. This may consist of a motor-driven cam connected to the antenna structure. Alternatively, in the Foster scanner, this may consist of the arrangement shown in FIGURE 4 to be described more fully below. The vertical orientation or lobing of the antenna preferably is carried out in an approximately square-wave manner.

Energy from antenna 9 impinges upon distant targets, and the reflected signals are received once more by 9, carried via transmission line 7 to transmit-receive unit 5 and then by receiver input connection 17 to radar receiver 19. The latter comprises RF, IF, detector, and video stages of well-known type. At output connection 21, signals at video frequency from receiver 19 are fed simultaneously to video amplifier 23 via connection 25 and to gated video amplifier 27 via connection 29. Amplified output voltages from amplifier 23 are fed by connection 31 to cathode ray tube 33. In this arrangement, the last-named output voltages are applied to control-grid electrode 35 to modulate the electron-beam current. Deflecting means 37 of well known type provides voltages for deflecting the electron beam of tube 33 along the azimuth and range coordinates of the type B display.

Block 37 also includes a multivibrator or similar gating arrangement connected by means of lead 40 to pulse generator 57 so as to derive synchronizing signals from generator 57. The output of the gating arrangement is applied to the range deflecting circuits and serves to delay the start of the range sweep an adjustable interval of time. Thus, for example, if the range of interest is 1 mile and extends from 4 to 5 miles, the gating arrangement would delay the start of the range sweep for the range interval extending from 0–4 miles. The delay interval may be manually adjusted in one form of the invention by means of knob 42 so connected to an adjustable resistor in the said multivibrator as to vary the length of its output pulse. In a preferred form of the invention, however, the gating arrangement is controlled automatically in a manner to be described later. If desired, the gate may also be applied to video amplifier 23 and receiver 19 to blank said stages during the periods of range not of interest. The circuits described in brief here are well known and need not be discussed in further detail.

Output signal pulses from amplifier 27, gated in a manner to be described presently, are fed by way of lead 39 to low-pass filter 41. The cut-off frequency of the latter is chosen to be less than the radar pulse repetition frequency. Signals from filter 41 are fed through connection 43 to phase comparator 45. The latter may comprise a balanced modulator or, alternatively, a reversing switch operating at the frequency of lobing commutator 15. Connection 47 from commutator 15 provides the required second input to phase comparator 45 to cause the latter to function either as a balanced modulator or reversing switch and be properly phased. It is to be understood that the alternative modes of operation given are merely different descriptions of the operation of a single class of circuit device.

The output from comparator 45 is fed via line 49 to low-pass filter 51. The cut-off frequency of the latter is chosen to reject components at the azimuth scanning frequency. The output of filter 51 at lead 53 is fed into integrator 54 which may be, for example, a reversible D.C. motor driving a potentiometer connected to a D.C. voltage source. The output of integrator 54 fed via connection 56 constitutes a control signal to the pedestal length of range-gate-delay circuit 55. The latter's repetition frequency is controlled by pulses originating in pulse generator 57 to which circuit 55 is connected by lead 59.

A second connection 61 from generator 57 controls the pulse repetition rate of transmitter 1. Incorporated in circuit 55 is multivibrator 58. The latter is well known and may be of the monostable two-tube type. Potential from lead 56 may, for instance, be applied to the control grid of one tube so as to increase or decrease the time in the unstable condition and hence the length of the delay pedestal. A suitable pulse-differentiating circuit of the RC type and a clipper are included in circuit 55 to generate a series of short-duration, delayed pulses.

The delayed pulses from circuit 55 are fed via lead 63 to range-gate pulse generator 65. The latter is a monostable multivibrator triggered by the delayed pulses from circuit 55. Generator 65 furnishes short pulses of fixed length $\Delta_g R$ through connection 67 to gated video amplifier 27 to render the latter operative only during the time of each range-gate pulse.

Delayed pulses from circuit 55 are likewise fed by connection 64 through delay circuit 64a and video amplifier 23 to control grid 35 of the indicator. The pulses are applied in such polarity as to produce a bright line or range marker on the screen of indicator. The function of the delay circuit is to delay the range marker pulses an interval sufficient that, by the time the pulses reach lead 31 they are spaced $$\frac{\Delta_g R}{2}$$

from the pulses applied via lead 63 to trigger generator 65. In other words, the range marker pulses are spaced in time in the exact center of the interval $\Delta_g R$.

Figure 2:
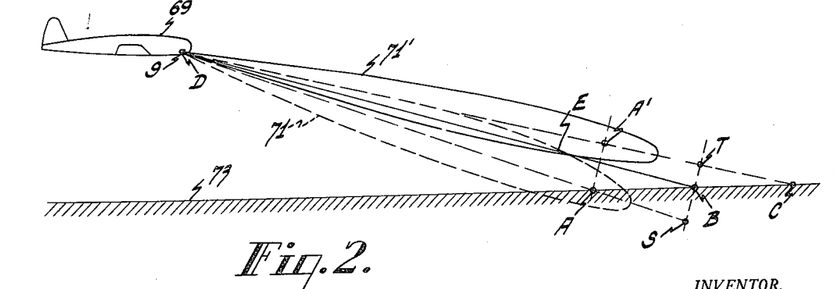
FIGURE 2 is a diagram of the geometric relations of the aircraft and the target area.

The functioning of the apparatus as described will be better understood if reference is made to FIGURE 2. Aircraft 69 carries the radar apparatus of FIGURE 1. Antenna 9, suitably located aboard aircraft 69, directs a beam in a forward and downward direction, this particular direction being shown for illustrative purposes. Simultaneous scanning in azimuth is utilized but is not shown in the figure. When antenna 9 is in the downward position, the radiation pattern is shown as lobe 71, while when the antenna is in the upward position (9' of FIGURE 1), the radiation pattern is shown as lobe 71'. A line DB which is the center line of the lobing pattern coincides precisely with the desired line of aim or boresight line of the weapons in the aircraft.

The radar display appearing on the screen of indicator 33 of FIGURE 1 is of the azimuth-range type, frequently referred to as a "type B" display. A range increment is displayed which starts at a minimum range $R_{min}$ and extends to a maximum range $R_{max}$. Methods of accomplishing this are well known and do not comprise the subject of the present invention. In one form of the invention, $\Delta R = R_{max} - R_{min}$ remains fixed, whereas $R_{min}$ and $R_{max}$ vary as a function of aircraft altitude.

Referring again to FIGURE 2, it is seen that the minimum range $R_{min}$ may be represented by the length of line DA or DA', and that only targets on the ground 73 in the vicinity of A will produce radar echoes at this range. Likewise the maximum range $R_{max}$ may be represented by DC. Here $A'C = \Delta R$. The range represented by distance DB will be designated by $R_0$.

In the present invention, the means provided and described serve to produce a marker on the indicator display at range $R_0$. This range marker may be a horizontal or transverse line on the screen if range is portrayed in the vertical or longitudinal direction on the screen of indicator 33. The range marker thus provides one of a pair of intersecting lines or "crosshairs" for sighting or aiming a missile on the aircraft.

Figures 3, 4:
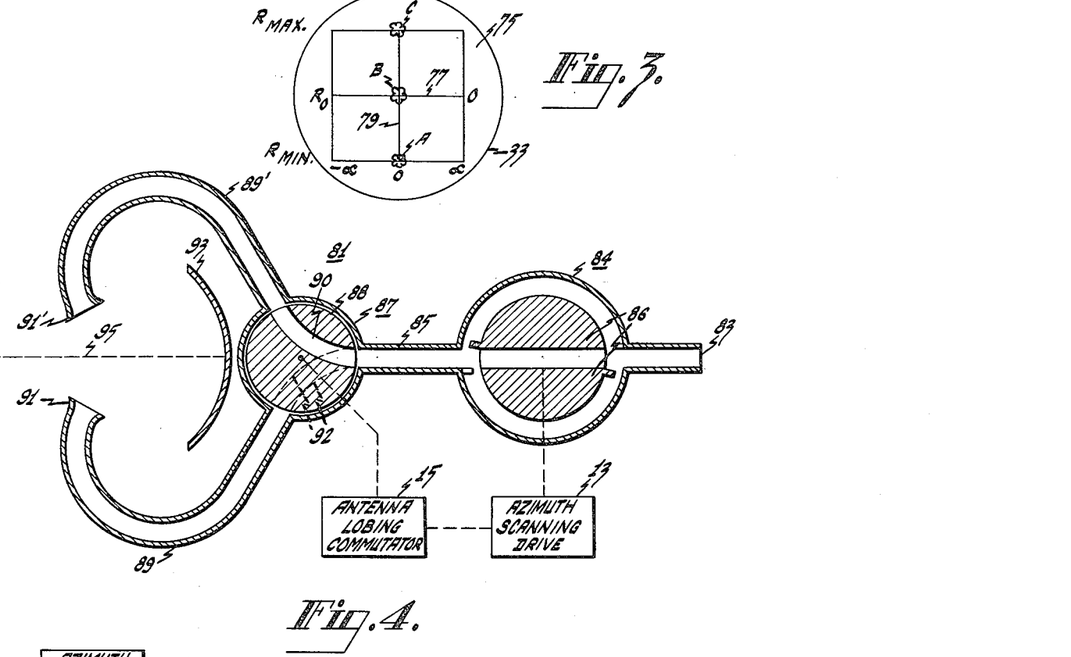
FIGURE 3 is a representation of the radar indicator screen when the device embodying the invention is employed.
FIGURE 4 is a cross-sectional view of a preferred lobing and scanning antenna.

In FIGURE 3 the appearance of the screen in a typical display is shown diagrammatically. The screen surface 75 of indicator 33 displays a radar picture with azimuth angles measured laterally (from $-\alpha$ to $+\alpha$) and range measured vertically (from $R_{min}$ to $R_{max}$). Azimuth angle 0 corresponds to the vertical plane of symmetry of the aircraft for aiming purposes.

Three targets at A, B and C are shown, corresponding to the points bearing the same designations in FIGURE 2 and lying in the vertical plane at an azimuth angle of 0. Electrically-generated line 77 is the range marker referred to in connection with the description of FIGURE 1. Line 79, corresponding to the center of the azimuth scan sector, is generated preferably as a pulse or pedestal signal fed into amplifier 23 (FIGURE 1) at the appropriate time in each azimuth scan in a familiar manner. For example, the arrangement may include a cam on the antenna azimuth drive means or on the antenna itself which actuates a pulse forming circuit. The arrangement is represented schematically in FIGURE 1 by block 80 which is connected to the video amplifier 23 by lead 82.

Referring again to FIGURE 3, lines 77 and 79 together constitute the crosshairs for aiming purposes. It will be noted that in the example of FIGURE 3 the system is aimed directly at the target at B. Elevation angle can be interpreted by reference to line 77. Thus, target C is above the boresight line whereas target A is below the boresight line. The display is equivalent to the projection of the horizontal plane containing line AC in FIGURE 2 on a plane normal to DB and thus containing line ST of that same figure.

FIGURE 4 shows a preferred arrangement of antenna 9. This comprises a Foster scanner shown in section at 81. The antenna is fed from a line source (not shown) such as a pill box, waveguide array or the like at input 83. The waves pass through scanning section 84 which includes a rotor 86 driven by the azimuth scanning drive means 13. The rotation of rotor 86 causes the antenna beam to scan in the plane including the focal line of parabolic cylindrical antenna 93 and axis 95, that is, to scan in azimuth in the specific form of the invention shown in FIGURE 1. The waves then pass through output parallel sheet structure 89 and horn 91 or corresponding output parallel sheet structure 89' and horn 91'. The two feed horns are arranged with their extended line apertures parallel to the focal line of cylindrical parabolic reflector 93 with said horns suitably located with respect to axis 95 to direct the axis of the main radiation lobe above or below axis 95.

Rotor 88 of switch 87 is driven by the antenna lobing commutator 15. The latter may in turn be activated by cams on the azimuth drive means or limit switches activated by the azimuth drive means at the limits of the scanned sector. When one limit is reached, the commutator abruptly rotates rotor 88 clockwise to a position such that waveguiding passageway 90 is in the position shown by dashed lines 92. When the other limit is reached, the rotor is abruptly rotated counter-clockwise to the position shown in FIGURE 4.

Figure 5:
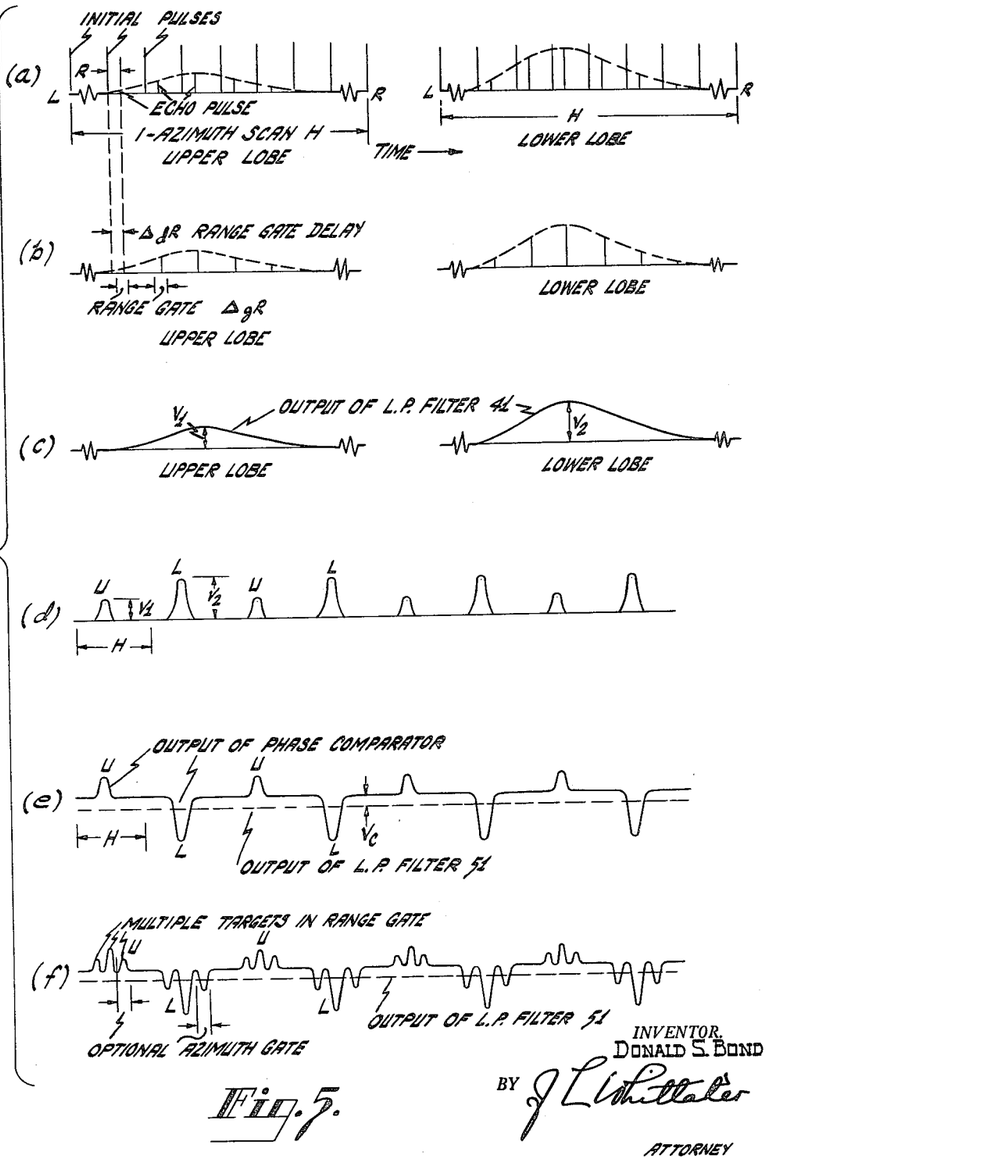

FIGURE 5 illustrates the waveforms in various parts of the circuit of the invention. It will be assumed first for illustrative purposes that the vertical lobing frequency is half the horizontal scanning frequency. A single target at range R will be assumed. In FIGURE 5a the transmitted (initial) pulses and the echo pulses from this one target are shown for two successive azimuth scans, the first with the antenna in the upper position and the second in the lower. The broken line in each case is the envelope of the echo pulses from the target. In the case shown, the signals received in the lower-lobe condition are stronger. Thus, the target range R must be less than $R_0$ (as defined in connection with the description of FIGURE 2). FIGURE 5b illustrates the waves present at connection 39 for the case in which the range delay $\Delta_d R$ is given by $$\Delta_d R = R$$

and the range gate length is $\Delta_g R$. The wave at the output of filter 41 is shown in FIGURE 5c and is repeated with a different time scale in FIGURE 5d. By the action of phase comparator 45, the pulses corresponding to the lower lobe and designated L in FIGURE 5d are inverted as shown in FIGURE 5e. The broken line in the latter figure shows the output of filter 51, from which components at lobing and horizontal scanning frequencies and their harmonics have been removed. The voltage $v_c$ is negative when $R<R_0$, positive for $R>R_0$, and zero for $R=R_0$. The rate of change of output voltage at lead 56 is proportional to $v_c$. Thus, when $v_c=0$, the output voltage at 56 is constant and the delay introduced by circuit 55 is fixed. This is the condition under which the range gate is properly set to $R_0$, that is $\Delta_d R = R_0$.

It is to be observed that the identity of the target changes as the range gate delay changes. It also changes in general as the aircraft moves and as the antenna scans in azimuth. It is essential that some target signals be received at each range to generate control signal $v_c$ if $R=R_0$. Sufficient gain in receiver 19 and amplifier 27 provides adequate received signals even from ground clutter.

In FIGURE 5f, the output of phase comparator 45 is shown for multiple targets at range R. The output of filter 51 then is the average of the pulse wave. If it is desired to utilize only the few targets at a certain azimuth, an azimuth gate amplifier similar to amplifier 27 but controlled from drive 13 may be inserted in cascade with 27.

Figure 6:
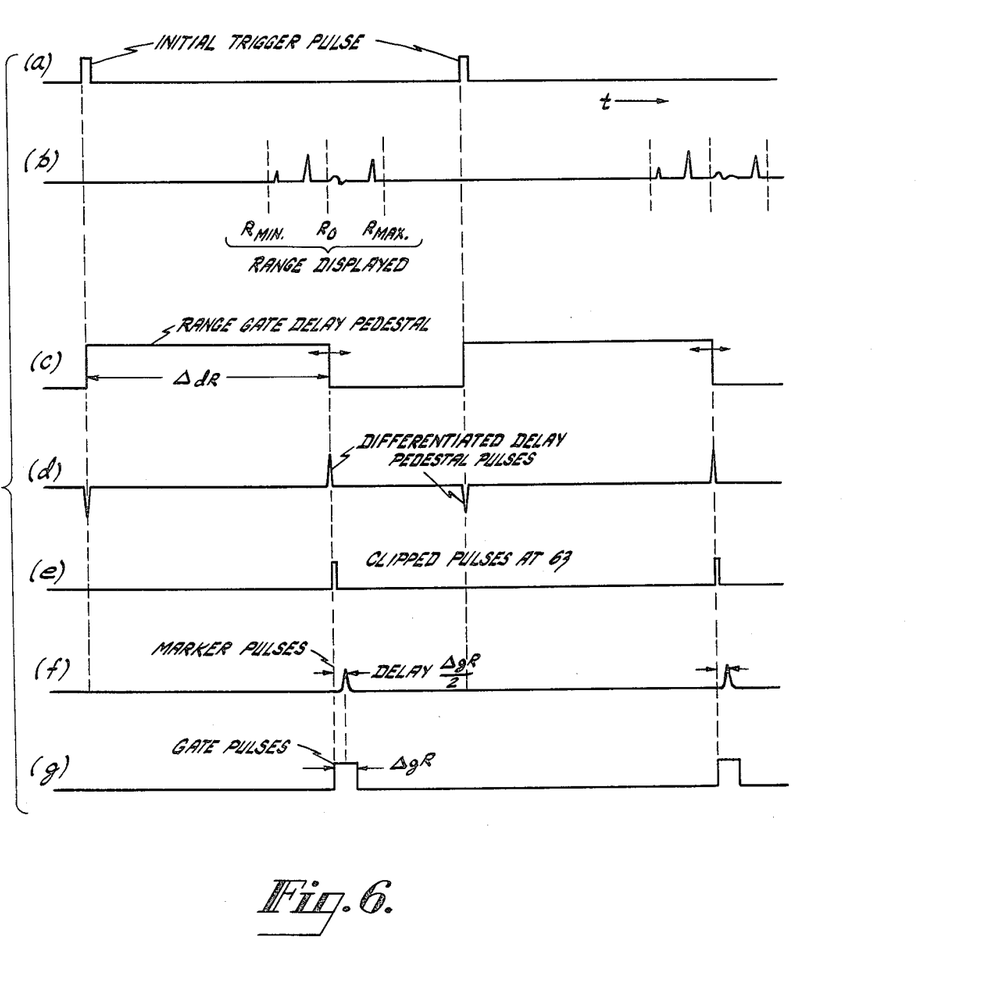

FIGURES 6a–g illustrate the waveforms present at various points in the circuit 55 and generator 65. The pulses at connection 59 are shown in FIGURE 6a; the range displayed is shown in FIGURE 6b; the pedestals of length $\Delta_d R$ generated by the multivibrator in circuit 55 are illustrated in FIGURE 6c; the differentiated pedestals are represented in FIGURE 6d; the pulses of FIGURE 6d after the negative pulses are removed by clipping are shown in FIGURE 6e; the marker pulses at lead 31, delayed an interval $$\frac{\Delta_g R}{2}$$

are shown in FIGURE 6f; and the range gate pulses of range length $\Delta_g R$ are shown in FIGURE 6g.

In a typical case employing the means described in the foregoing, the pulse-repetition frequency is 16,000 cycles per second, the horizontal-scanning frequency is 30 per second, and the lobing rate is 15 per second. As an alternative, the lobing frequency may be chosen to be between the horizontal-scanning and the pulse-repetition frequencies. The range displayed $R_{max}-R_{min}$ may be on the order of 2000 yards (about 12 microseconds) and the gate $\Delta_g R$ ordinarily less than a microsecond for this range. It is to be understood, of course, that these specific figures are merely illustrative of the invention and not limiting thereof. Changes in the filters, including the substitution of one of bandpass type for stage 41, are possible.

Figure 7:
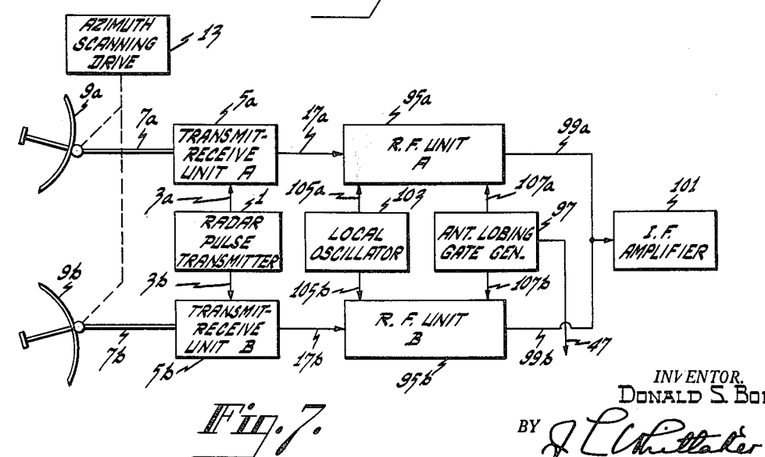
FIGURE 7 is a block circuit diagram of an alternative lobing arrangement for the present invention.

A system in which the lobing is effected at a frequency higher than the practical limit for mechanically driven systems is shown in FIGURE 7. In the latter figure, two separate scanning antennas 9a and 9b replace lobing antenna 9 of FIGURE 1, and these antennas are oriented to the positions 9 and 9' of the antenna of FIGURE 1.

Parts 3a and 3b, 5a and 5b, 7a and 7b, 17a and 17b perform the functions of parts 3, 5, 7 and 17, respectively, of FIGURE 1 for duplicate channels. RF units 95b comprise RF mixers and one or more IF amplifier stages arranged to be rendered alternatively operative by antenna lobing gate generator 97, whose function is similar to that of commutator 15 of FIGURE 1. Output connections 99a and 99b from units 95a and 95b are combined at the input to IF amplifier 101. A common local oscillator 103 supplies its output to units 95a and 95b over leads 105a and 105b, respectively. Succeeding stages are similar to the corresponding ones in FIGURE 1, beginning with these incorporated in receiver 19.

It is evident in this alternative arrangement that the antenna lobing may be performed by purely electronic means. If desired, the two receiving channels may be separated up to a later stage, for example, a video amplifier, and then combined. Likewise, two complete radar receiver chains may be employed with two gated amplifiers and filters substituted for parts 27 and 41 of FIGURE 1, and the corresponding outputs combined in opposing polarity at connection 49. This is analogous to the so-called "simultaneous lobing" radar system, but differs in that the gated amplifiers 27 and other elements of the gating system of the invention are included.

Figure 8:
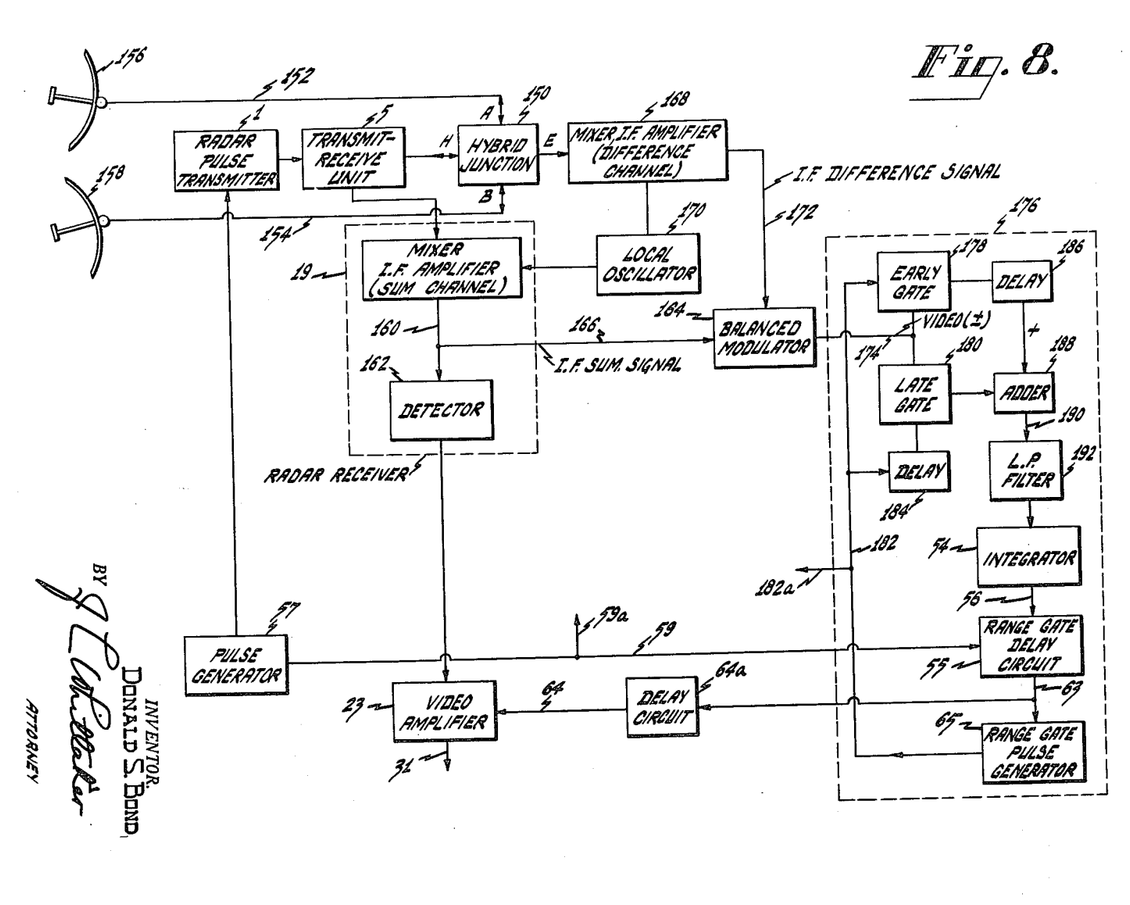
FIGURE 8 is a block circuit diagram of a simultaneous lobing arrangement which may be employed in the present invention.

FIGURE 8 illustrates in block diagram form a simultaneous lobing arrangement suitable for use in the present invention. Elements similar in structure and function to analogous elements in the arrangement of FIGURE 1 are marked with similar reference numerals.

Transmitter 1 applies high-power pulses of RF energy through TR device 5 to the shunt arm (H) of a hybrid junction 150. The latter may be of the "magic T" type. This energy is coupled equally into the two symmetrical arms A and B of the junction. No RF energy is coupled into the series arm E of the junction. The equal RF outputs of arms A and B are applied via leads 152 and 154 to directive antennas 156 and 158, respectively. The outputs of the two arms A and B are in phase and therefore the two antennas radiate in phase. The radiated pattern consists of two lobes which overlap in the vertical plane.

Echoes received by antennas 156 and 158 are applied to the two symmetrical arms A and B of junction 150. The signals add in arm H and subtract in arm E. The sum signal is applied to radar receiver 19. Intermediate-frequency signals at lead 160 in receiver 19 are fed to detector 162 and to balanced modulator 164 by connection 166. The difference RF signal at arm E of junction 150 is fed to the difference-channel receiver 168, comprising mixer and IF amplifier and excited by local RF oscillator 170 common to receiver 19. Difference IF signals at lead 172 are fed to balanced modulator 164. Because of the definite phase relationship of IF signals at leads 166 and 172, the output video-frequency signal at lead 174 and a given instantaneous range will have a D.C. component of polarity determined by relative received signal intensities at antennas 156 and 158. In other words, the signal at 174 will be a wave repeating at the pulse-repetition frequency and each such wave will reverse in polarity at the range $R_0$ for which the two signals are equal.

A signal is generated in range discriminator 176 by means to be described so as to produce a pulse at lead 63 at substantially the time corresponding to range $R_0$. This is accomplished by stages 178 and 180 which are rendered conducting by a pulse applied from range gate pulse generator 65 via lead 182. Delay circuit 184 is interposed between lead 182 and gate 180 so that gate 178 is rendered conducting before gate 180. Then in a well-known manner, the output gated signal from 178 is delayed in network 186 and added differentially to the output of 180 in adder 188. The difference signal at lead 190 is then fed through low-pass filter 192 to integrator 54 and thence via lead 56 to range gate delay circuit 55.

Figure 9:
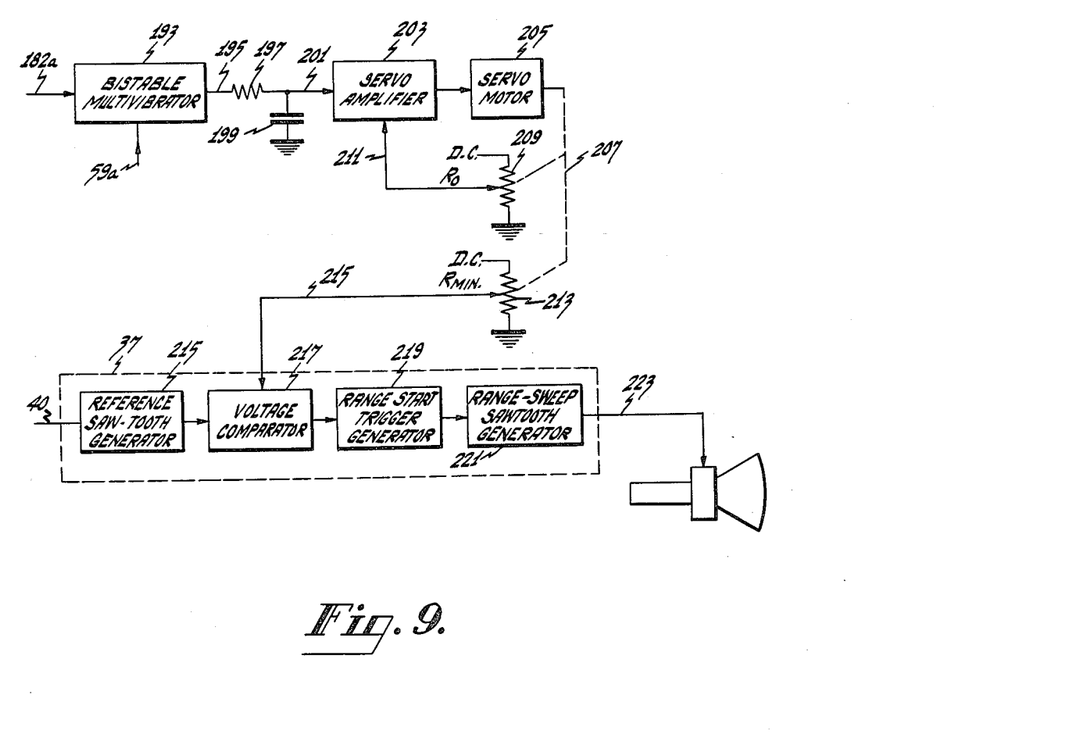
FIGURE 9 is a block circuit diagram of the range deflection circuit employed in the present invention.

Reference has been made above to means for starting the range sweep on the display automatically. In particular, it is often desirable to cause the marker 77 of FIGURE 3 to be centered vertically on the display. A means of accomplishing this is shown in FIGURE 9. In said diagram bistable multivibrator 193 is turned "on" by the initial pulse at lead 59a of FIGURES 1 and 8 and is turned "off" by pulse on lead 182a corresponding to range $R_0$. Output at lead 195 consists of a square-topped pulse of variable length, depending on the value of $R_0$ measured by range comparator 176 of FIGURE 8. Resistor 197 and capacitor 199 integrate this pulse to give a D.C. voltage at lead 201 proportional to range $R_0$. Servo amplifier 203 and motor 205 connected thereto cause shaft 207 to be driven to an angular position corresponding to $R_0$. This circuit is well known, potentiometer 209 producing a comparison D.C. voltage at lead 211, said voltage being being subtracted from voltage on lead 201 in amplifier 203. A second potentiometer 213 attached to shaft 207 produces on lead 215 a D.C. voltage chosen to represent the starting range $R_{min}$.

The range channel of circuit 37 is shown in FIGURE 9. The system is well known and is not a part of this invention. Part 215 may comprise a Miller integrator; the voltage comparator 217 may be a double triode "long-tailed pair"; the range-start trigger generator 219 can be a blocking oscillator; and sawtooth generator 221 may be a second Miller integrator. The amplitude of the signal at lead 223 is chosen to make the desired range increment $R_{max}-R_{min}$ fill the vertical dimension of the display. Such circuits are described by Chance, Hulsizer, MacNichol and Williams in the book, "Electronic Time Measurements," 1st edition, published by McGraw-Hill Book Company in 1949.

What is claimed is:

1. In combination, means for radiating energy in a directive beam pattern including two directive lobes displaced a relatively small angle from one another and receiving energy reflected from objects in the paths of said two lobes; display means for displaying the received energy in a two-coordinate display one of whose coordinates represents range; means for detecting the energy received from objects in the path of each said lobe in a restricted interval of the range displayed on said display means, said restricted interval being a fraction of the entire range interval displayed on said display means; comparison means for comparing the energy received in said restricted interval of range from objects in the path of one said lobe with that received in said restricted interval from said objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to adjust said control signal to a predetermined value; and range indication means controlled by said adjusting means for placing a range indication on said display at the range at which said control signal is said predetermined value.

2. In the combination as set forth in claim 1, said radiating and receiving means including means for simultaneously radiating said two lobes.

3. In the combination as set forth in claim 1, said radiating and receiving means including means for alternately radiating said two lobes.

4. In combination, means for radiating energy in a directive beam pattern including two directive lobes displaced a relatively small angle from one another and receiving energy reflected from objects in the paths of said two lobes; display means for displaying the received energy in a two coordinate, angle-range type display; means for detecting the energy received from objects in the path of each said lobe in a restricted interval of the range displayed on said display means, said restricted interval being a fraction of the entire range interval displayed on said display means; comparison means for comparing the energy received in said restricted interval of range from objects in the path of one said lobe with that received in said restricted interval from said objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to reduce said control signal to zero; range indication means controlled by said adjusting means for placing a range indication on said display at the range at which said control signal is zero; and means responsive to said control signal for adjusting the range increment displayed on said display means so that said range indication occurs at the center of said range increment.

5. In combination, means for radiating energy in a directive beam pattern including two directive lobes displaced a relatively small angle from one another and receiving energy reflected from objects in the paths of said two lobes; display means for displaying the received energy in a two coordinate, angle-range type display; means for detecting the energy received from objects in the path of each said lobe in a fraction of the entire range interval displayed on said display means; comparison means for comparing the energy received in said fraction of said entire range interval from objects in the path of one said lobe with that received from said objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to reduce said control signal to zero; and range indication means controlled by said adjusting means for placing a range indication on said display at a position corresponding to the center of the range interval on said display.

6. In combination, means for radiating pulses of high frequency energy in a directive beam pattern including two directive lobes displaced a relatively small angle from one another and receiving echoes reflected from objects in the paths of said two lobes; display means for displaying said received echoes in a two coordinate, angle-range type display; means for detecting the echoes received from objects in the path of each said lobe in a restricted interval of the range displayed on said display means, said restricted interval being a fraction of the entire range interval displayed on said display means; comparison means for comparing the energy received in said restricted interval of range from objects in the path of one said lobe with that received in said restricted interval from objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to reduce said control signal to zero; and range marker means controlled by said adjusting means for placing a range mark on said display at the range at which said control signal is zero; means for scanning said two directive lobes through sectors in space lying in planes perpendicular to the direction of displacement of said two lobes; and marker means operatively associated with said scanning means for placing an angle mark on said display which intersects said range mark.

7. In combination, means for radiating energy in a directive beam pattern including two directive lobes displaced a relatively small angle from one another in a vertical plane and receiving echoes reflected from objects in the paths of said two lobes; scanning means operatively associated with said last-named means for scanning said two directive lobes through a sector in azimuth; cathode ray tube indicator means for displaying said received echoes in an azimuth-range type display; means for detecting the echoes received from objects in the path of each said lobe in a restricted interval of the range displayed on said cathode ray tube indicator, said restricted interval being a fraction of the entire range interval displayed on said cathode ray tube indicator; comparison means for comparing the echoes received in said restricted interval of range from objects in the path of one said lobe with the echoes received in said restricted interval from said object in the path of the other said lobe and deriving therefrom, when they are different in amplitude, a control signal having a sense and magnitude which are functions of the sense and magnitude of said difference in amplitude; adjusting means responsive to said control signal for adjusting the position in range of said restricted range interval to reduce said control signal to zero; and range marker means controlled by said adjusting means for intensity modulating said cathode ray tube indicator to produce a range mark on the screen of said indicator which occurs midway between the minimum and maximum ranges displayed on said cathode ray tube indicator.

8. In the combination as set forth in claim 7, said means for radiating and receiving including means for alternately radiating said lobes, and said means for radiating and receiving comprising a Foster scanner.

9. In a radar system, in combination, means for radiating pulses of radio-frequency energy and receiving echoes from objects in the path of said radiated pulses; means receptive of said echoes for displaying the latter in a range type display extending from a given minimum range $R_{min}$ to a given maximum range $R_{max}$, where $R_{min}$ and $R_{max}$ may both be variable; means responsive to at least some of said echoes for generating a range marker at a range $R_0$ midway between $R_{min}$ and $R_{max}$; means for applying said range marker to said display, and means responsive to said echoes for adjusting $R_{min}$ and $R_{max}$ to values such that said range marker continues to be displayed midway between $R_{min}$ and $R_{max}$.

10. In a radar system, in combination, means for radiating pulses of radio-frequency energy in a directive pattern and receiving echoes from objects in the path of said pattern; means for scanning said pattern through an angle in space; means receptive of said echoes for displaying the same in an angle-range display, the angle coordinate on said display corresponding to the scanned angle, and the range extending from a given minimum range, $R_{min}$, to a given maximum range, $R_{max}$, where $R_{min}$ and $R_{max}$ may both be variable; means responsive to some of said echoes for generating a range marker at a range $R_0$ midway between $R_{min}$ and $R_{max}$; means responsive to said means for scanning for generating an angle marker at the bisector of the scanned angle; and means for applying said range marker and angle marker to said display.

11. In combination, means for radiating energy in a plurality of directive beam patterns including two directive lobes displaced a relatively small angle from one another, said plurality of directive beam patterns receiving energy reflected from objects in the paths of said beams; display means for displaying the energy received from at least one of said plurality of directive beam patterns in a two-coordinate display, one of whose coordinates represents range; means for detecting the energy received from objects in the path of each of said two displaced directive lobes in a restricted interval of the range displayed on said display means, said restricted interval being a fraction of the entire range interval displayed on said display means; comparison means for comparing the energy received in said restricted interval of range from objects in the path of one said lobe with that received in said restricted interval from said objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to adjust said control signal to a predetermined value; and range indication means controlled by said adjusting means for placing a range indication on said display at the range corresponding to said control signal of predetermined magnitude.

12. In combination, means for radiating energy directively, receiving means including a plurality of directive beam patterns and including two directive lobes displaced a relatively small angle from one another, said plurality of directive beam patterns receiving energy reflected from objects in the paths of said beams and said directive radiating means; display means for displaying the energy received from at least one of said plurality of directive beam patterns in a two-coordinate display, one of whose coordinates represents range; means for detecting the energy received from objects in the path of each of said two displaced directive lobes in a restricted interval of the range displayed on said display means, said restricted interval being a fraction of the entire range interval displayed on said display means; comparison means for comparing the energy received in said restricted interval of range from objects in the path of one said lobe with that received in said restricted interval from said objects in the path of the other said lobe and deriving therefrom, when they are different in amplitude, a control signal having a sense and magnitude which are functions of the sense and magnitude of said difference in amplitude; adjusting means responsive to said control signal for adjusting the position in range of said range interval to adjust said control signal to a predetermined value; and range indication means controlled by said adjusting means for placing a range indication on said display at the range corresponding to said control signal of predetermined magnitude.

13. In combination, means for simultaneously radiating pulses of high frequency energy in a directive beam pattern including two directive lobes displaced a relatively small angle from one another and receiving echoes reflected from objects in the paths of said two lobes, means for adding the received echoes resulting from pulse transmission in one lobe with the received echoes resulting from pulse transmission in the other lobe to obtain a sum signal, means for subtracting the received echoes resulting from pulse transmission in one lobe from the received echoes resulting from pulse transmission in the other lobe to obtain a difference signal, means for comparing said sum and difference signals to obtain a reference signal that reverses polarity at a point corresponding to the axis of symmetry of said two lobes, means for producing at least one range gate pulse which is adjustable in timing with respect to said reference signal, means for developing a control signal as a function of the relative timing of said gate pulse and said reference signal and means responsive to said control signal to adjust the timing of said gate pulse to bring said control signal to a predetermined value, means for producing a range marker pulse which is adjustable in timing as a function of said control signal, display means for displaying said received echoes in a range type display, and means supplying said range marker pulse to said display means with its timing so controlled by said control signal as to place a range mark on said display at the range at which said control signal is said predetermined value.

14. In combination, means for simultaneously radiating pulses of high frequency energy in a directive beam pattern including two directive lobes displaced a relatively small angle from one another and receiving echoes reflected from objects in the paths of said two lobes, means for adding the received echoes resulting from pulse transmission in one lobe with the received echoes resulting from pulse transmission in the other lobe to obtain a sum signal, means for subtracting the received echoes resulting from pulse transmission in one lobe from the received echoes resulting from pulse transmission in the other lobe to obtain a difference signal, means for comparing said sum and difference signals to obtain a reference signal that reverses polarity at a point corresponding to the axis of symmetry of said two lobes, means for producing at least one range gate pulse which is adjustable in timing with respect to said reference signal, means for devolping a control signal as a function of the relative timing of said gate pulse and said reference signal and means responsive to said control signal to adjust the timing of said gate pulse to bring said control signal to a predetermined value, means for producing a range marker pulse which is adjustable in timing as a function of said control signal, display means for displaying said received echoes in a two coordinate, angle-range type display, and means supplying said range marker pulse to said display means with its timing so controlled by said control signal as to place a range mark on said display at the range at which said control signal is said predetermined value.

15. In combination, means for simultaneously radiating pulses of high frequency energy in a directive beam pattern including two directive lobes displaced a relatively small angle from one another and receiving echoes reflected from objects in the paths of said two lobes, means for adding the received echoes resulting from pulse transmission in one lobe with the received echoes resulting from pulse transmission in the other lobe to obtain a sum signal, means for subtracting the received echoes resulting from pulse transmission in one lobe from the received echoes resulting from pulse transmission in the other lobe to obtain a difference signal, means for comparing said sum and difference signals to obtain a reference signal that reverses polarity at a point corresponding to the axis of symmetry of said two lobes, means for producing at least one range gate pulse which is adjustable in timing with respect to said reference signal, means for developing a control signal as a function of the relative timing of said gate pulse and said reference signal and means responsive to said control signal to adjust the timing of said gate pulse to bring said control signal to a predetermined value, means for producing a range marker pulse which is adjustable in timing as a function of said control signal, display means for displaying said received echoes in a two coordinate, angle-range type display, means supplying said range marker pulse to said display means with its timing so controlled by said control signal as to place a range mark on said display at the range at which said control signal is said predetermined value, and means for scanning said two directive lobes through sectors in space lying in planes perpendicular to the direction of displacement of said two lobes; and marker means operatively associated with said scanning means for placing an angle mark on said display which intersects said range mark.

16. In combination, means for radiating high frequency energy in a directive beam pattern at an angle with respect to the earth's surface, said pattern including two directive lobes displaced in a vertical plane a relatively small angle from one another and receiving energy reflected from objects in the paths of said two lobes, said two lobes having an axis of symmetry, means for producing at least one range gate pulse which is adjustable in timing with respect to the time corresponding to the range where said axis of symmetry strikes a target, means for developing a control signal as a function of the relative timing of said gate pulse and the time corresponding to said range and means responsive to said control signal to adjust the timing of said gate pulse to bring said control signal to a predetermined value, means for producing a range sweep which is adjustable in starting time as a function of said control signal, display means to which said sweep is applied for displaying said received echoes in a range type display, and means for so controlling the start of said sweep by said control signal as to display a desired range region within the range region covered by said lobes.

17. In combination, means for simultaneously radiating high frequency energy in a directive beam pattern including two directive lobes displaced a relatively small angle from one another and receiving energy reflected from objects in the paths of said two lobes, means for adding the received energy resulting from pulse transmission in one lobe with the received energy resulting from pulse transmission in the other lobe to obtain a sum signal, means for subtracting the received energy resulting from pulse transmission in one lobe from the received energy resulting from pulse transmission in the other lobe to obtain a difference signal, means for comparing said sum and difference signals to obtain a reference signal that reverses polarity at a point corresponding to the axis of symmetry of said two lobes, said directive beam pattern to be directed at an angle with respect to the earth's surface with said lobes being displaced from one another in a vertical plane, said lobes covering a limited range region along a surface parallel to the earth's surface, said limited range region including a desired range region that it is desired to display, means for producing at least one range gate pulse which is adjustable in timing with respect to said reference signal, means for developing a control signal as a function of the relative timing of said gate pulse and said reference signal and means responsive to said control signal to adjust the timing of said gate pulse to bring said control signal to a predetermined value, means for producing a range sweep which is adjustable in starting time as a function of said control signal, display means to which said sweep is applied for displaying said received echoes in a range type display, and means for so controlling the start of said sweep by said control signal as to display said desired range region.

References Cited in the file of this patent

UNITED STATES PATENTS

| | | |
|---|---|---|
| 2,509,207 | Busignies | May 30, 1950 |
| 2,774,964 | Baker | Dec. 18, 1956 |
| 2,776,422 | Slusser | Jan. 1, 1957 |
| 2,881,423 | Jacobson et al. | Apr. 27, 1959 |